United States Patent
Peremarty et al.

(10) Patent No.: US 8,960,095 B2
(45) Date of Patent: Feb. 24, 2015

(54) GAS GENERATOR WITH REACTIVE GASES

(75) Inventors: François Peremarty, Quimper (FR);
Franck Camborde, Quimper (FR);
Yvonnig Patton, Plougastel Daoulas
(FR); Nicolas Daviot, Hanvec (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/511,815

(22) PCT Filed: Nov. 25, 2010

(86) PCT No.: PCT/EP2010/068188
§ 371 (c)(1),
(2), (4) Date: May 24, 2012

(87) PCT Pub. No.: WO2011/064286
PCT Pub. Date: Jun. 3, 2011

(65) Prior Publication Data
US 2012/0266774 A1    Oct. 25, 2012

(30) Foreign Application Priority Data

Nov. 25, 2009 (FR) .................................... 09 58347

(51) Int. Cl.
*F42B 3/04* (2006.01)
*B60R 21/268* (2011.01)
*B60R 21/274* (2011.01)

(52) U.S. Cl.
CPC ............... *F42B 3/045* (2013.01); *B60R 21/274* (2013.01); *B60R 2021/2685* (2013.01)
USPC ............................. 102/530; 280/737; 280/741

(58) Field of Classification Search
USPC .................. 102/530, 531; 280/736, 737, 741
See application file for complete search history.

(56) References Cited

U.S. PATENT DOCUMENTS

| 5,673,933 | A  |    | 10/1997 | Miller et al.         |         |
|-----------|----|----|---------|-----------------------|---------|
| 5,984,351 | A  | *  | 11/1999 | Pierotti et al.       | 280/736 |
| 6,676,157 | B2 | *  | 1/2004  | Nanbu                 | 280/736 |
| 6,746,046 | B2 | *  | 6/2004  | Rink et al.           | 280/737 |
| 6,814,371 | B2 | *  | 11/2004 | Welz                  | 280/736 |
| 6,820,898 | B2 | *  | 11/2004 | Dinsdale et al.       | 280/737 |
| 6,857,657 | B2 |    | 2/2005  | Canterberry et al.    |         |
| 7,004,500 | B2 | *  | 2/2006  | Dinsdale et al.       | 280/737 |
| 7,328,914 | B2 | *  | 2/2008  | Katsuda et al.        | 280/736 |
| 7,338,073 | B2 | *  | 3/2008  | Nakayasu              | 280/737 |
| 7,393,009 | B2 | *  | 7/2008  | Rink                  | 280/737 |
| 7,828,324 | B2 |    | 11/2010 | Herget et al.         |         |

FOREIGN PATENT DOCUMENTS

DE     19709584 A1     9/1998

OTHER PUBLICATIONS

International Search Report and Written Opinion for PCT/EP2010/068188, ISA/EP, Rijswijk, NL, mailed Mar. 8, 2010.

* cited by examiner

*Primary Examiner* — James S Bergin
(74) *Attorney, Agent, or Firm* — Harness, Dickey & Pierce, P.L.C.

(57) ABSTRACT

A gas generator includes two reserves of reactive gases, an ignition device capable of being triggered in order to open lids of the reserves and initiating combustion of the reactive gases, and an orifice for letting out combustion gas towards the outside. The gas reserve, a device for diffusing the combustion gas towards the outside and the second gas reserve are successively positioned along a longitudinal direction. A guiding wall is provided in the reserve for guiding the pressure wave generated by the device up to the lid in order to open this first lid. The diffusing device includes a conduit for guiding the pressure wave from the first lid to the second lid so as to open the latter, and which communicates with the orifice.

16 Claims, 5 Drawing Sheets

GAS GENERATOR WITH REACTIVE GASES

CROSS-REFERENCE TO RELATED APPLICATIONS

This application is a 371 U.S. National Stage of International Application No. PCT/SE2010/068188, filed Nov. 25, 2010, and published in English as WO 2011/064286 A1 on Jun. 3, 2011. This application claims the benefit of French Patent Application No. 0958347, filed Nov. 25, 2009. The entire disclosures of the above applications are incorporated by reference herein.

FIELD

The invention relates to a gas generator using reactive gases.

BACKGROUND

A gas generator is used to inflate a safety cushion (airbag) in an automotive vehicle to protect a person.

In particular, a field of the invention relates to gas generators for passive frontal or lateral protection, and more particularly to inflatable cushions of the curtain type.

These gas generators include two gas reserves each containing a reactive gas. To generate gas externally, the two reserves are opened and the two reactive gases are allowed to react by combustion to diffuse combustion gas to the outside, which will be the inflation gas.

One of the problems of reactive-gas gas generators is the weight gain and the volume gain, which are constraints imposed by automobile manufacturers.

SUMMARY

The invention aims to arrive at a reactive-gas gas generator that allows these problems to be resolved.

To this effect, a first object of the invention is a reactive-gas gas generator, including:

a first reserve of pressurized gas delimited by a first wall containing a first reactive gas and closed by at least one first closing lid capable of being opened, a second reserve of pressurized gas containing a second reactive gas and closed by at least one second closing lid capable of being opened, an ignition device capable of being triggered in order to open the lids and initiate combustion of the first reactive gas with the second reactive gas in order to generate combustion gas, at least one outlet orifice for letting out the combustion gas towards the outside, characterized in that the ignition device being provided in a first longitudinal end of the generator and including means laid out in order to generate a pressure wave during its triggering, the ignition device, the first gas reserve, a diffusing device for diffusing combustion gas towards the outside and the second gas reserve are successively positioned along a longitudinal direction, the first closing lid being provided between the first gas reserve and the diffusing device, the second closing lid being provided between the diffusing device and the second gas reserve, a guiding wall, distinct from the first wall, being provided in the first gas reserve for guiding the pressure wave generated by the ignition device up to the first lid in order to open this first lid, the diffusing device delimiting a conduit for letting through gas, which is laid out so as to guide the pressure wave from the first lid to the second lid in order to open this second lid, and which communicates with said outlet orifice.

Thanks to the invention, it is possible to trigger the generator from a single ignition device including a single electro-pyrotechnic initiator located at the longitudinal end, while still having the diffusing device located between the two longitudinal ends of the generator and between the two reserves, and for example substantially in the middle along the longitudinal direction, which is advantageous particularly in narrow surroundings such as those of inflatable cushions of the curtain type.

According to embodiments of the invention:

The first and second lids are attached onto first and second sides of the diffusing device respectively, the conduit opening into the first side towards the first lid on the one hand and into the second side towards the second lid on the other hand, the conduit being found in the extension of the guiding wall.

The first and second sides of the diffusing device are located inside the first and second reserves respectively, said orifice being provided on an outer surface of the diffusing device extending between the first side and the second side.

The first outer wall extends towards the diffusing device with a first inner wall having at least one hole for letting through gas, closed by the first lid attached to the first inner wall, the second reserve is delimited by an outer wall extending towards the diffusing device with a second transverse inner wall having at least one hole for letting through gas closed by the second lid attached to the second inner wall.

The first lid is attached to the first inner wall while being on the side of the reserve away from the diffusing device.

The second lid is attached to the second inner wall while being on the side of the reserve, away from the diffusing device.

The diffusing device has an outer wall, which delimits the inner conduit, which includes said at least one outlet orifice and which surrounds said first and second inner walls of the first and second reserves, formed by stamping of the first and second outer walls.

The guiding wall includes at least one hole for letting through gas in the first reserve.

The guiding wall includes a shoulder bearing against the diffusing device and/or against the portion of the first lid attached to the diffusing device.

The ignition device includes an electro-pyrotechnic initiator including electric control pins which are accessible at the first longitudinal end of the generator and a cap containing a pyrotechnic charge including one side turned towards a separation wall for separation relatively to the first reserve, so that the application of an electric control signal to the pins causes ignition of the pyrotechnic charge of the initiator causing the breaking of the separation wall and the release of the pressure wave in the guiding wall upon triggering.

BRIEF DESCRIPTION OF THE DRAWINGS

The invention will be better understood upon reading the description that follows, given purely as a non-limiting example with reference to the appended drawings, in which.

DETAILED DESCRIPTION

In the figures, gas generator 1 includes successively, along a longitudinal direction L between a first longitudinal end 11 and a second longitudinal end 12:
- a single electro-pyrotechnic initiator 2, also called an electro-pyrotechnic igniter,
- a first reserve 3 of gas under pressure,
- a gas diffusing device or gas diffuser 4,
- a second reserve 5 of gas under pressure.

Reserves 3 and 5 have a shape that is elongated in the longitudinal direction L. The transverse direction extends in a plane perpendicular to the longitudinal direction L. Generator 1 has its greatest dimension along this longitudinal direction L, which is greater than its transverse dimensions. Gas diffuser 4 is attached between reserves 3 and 5, i.e. between their respective outside walls 7, 9.

A mixture made up of a first reactive gas and an inert gas under pressure is stored in reserve 3. A mixture made up of a second reactive gas different from the first reactive gas, and an inert gas different from or identical to the inert gas contained in first reserve 3, is stored in reserve 5. The first reactive gas and the second reactive gas are able to react with one another by combustion to generate combustion gas. The first reactive gas is for example hydrogen. The second reactive gas is for example oxygen. The inert gas in reserves 3 and 5 is for example argon.

Electro-pyrotechnic initiator 2 is provided at longitudinal end 11 and includes two metal pins 21, 22 accessible from outside at the first end 11 for electrical connection for triggering initiator 2, for example by being connected to an external electrical triggering circuit, not shown, which sends a triggering signal in response to the fact that a sensor, not shown, detects a shock to the automotive vehicle. Pins 21, 22 pass through a retaining piece 23 including at end 11 a part 230 laterally surrounding a hollow compartment 231 in which the free end of pins 21, 22 is found in end 11. Piece 23 includes, between its part 230 and bracing part 232, a central neck 233 which pins 21 and 22 pass through longitudinally and which is surrounded laterally by an insert 24 also laterally surrounding parts 230 and 232. Insert 24 allows initiator 2 to be held in place in an end housing 25. Housing 25 includes a part 250 laterally surrounding insert 24 and forming the outside surface of generator 1 at end 11, this part 250 being connected by sidewalls 254 to a dome 251 surrounding cap 20 of initiator 2, this dome 251 being located inside the first reserve 3. Part 232 is borne on the inside of housing 25, being for example welded to it.

Cap 20 includes a longitudinal side 26, which is the one farthest from the first end 11 and pins 21, 22 and which is used for igniting the reactive gases. Facing this side 26, that is remote from the first end 11, is located a reduced thickness section 252 of dome 251 capable of rupturing when initiator 2 is ignited, this part 252 serving as a third lid closing reserve 3 and capable of being opened by initiator 2, this third lid 252 being separate from the first and second lids 8 and 13. Dome 251 includes a lateral wall 253 transversely surrounding cap 20, this lateral wall being extended longitudinally by the reduced thickness frontal part 252. Sidewalls 254 of housing 25, located remotely from dome 251, are attached to a first outside wall 7 of first reserve 3. Dome 251 thus forms a closed compartment 255 within which is located cap 20 of initiator 2. Part 252 thus constitutes with electro-pyrotechnic initiator 2 a means of releasing a pressure wave upon ignition of initiator 2. Part 252 also forms a separating wall 252 with respect to first reserve 3.

A first lid 8 extending transversely is attached to a first longitudinal side of diffuser 4 to delimit, with first wall 7 and dome 251, the first reserve 3. Diffuser 4 includes a second longitudinal side 42, more distant from initiator 2 than from first longitudinal side 41 in the longitudinal direction L. Second side 42 of diffuser 4 is attached to a second outside wall 9 of second reserve 5, wherein the second outside wall 9 is attached at second longitudinal end 12 to a closing device 10. A second transversely extending lid 13 is attached to the second side 42 of diffuser 4. Lids 8 and 13 are for example welded respectively to sides 41 and 42 of diffuser 4. Of course, lids 8, 13 could also be attached to extensions of walls 7, 9 and forming the two different sides 41, 42 of diffuser 4.

The second reserve 5 is delimited by second lid 13, second wall 9 and closing device 10. Outside walls 7, 9 of reserves 3, 5 respectively include a device used for filling the reserves with gas, closed for example by a plug 71, 91 respectively.

Diffuser 4 is therefore held between first wall 7 and second wall 9. Diffuser 4 delimits an inside gas passage conduit 43, conduit 43 running from first side 41 to second side 42 and being closed on the one hand by first lid 8 and on the other hand by second lid 13. Between sides 41 and 42, diffuser 4 includes gas exit orifices 44 to the outside, each made up of a secondary conduit 440 opening on the one hand inside the main conduit 43 and on the other on the outside surface 45 of diffuser 4. A plurality of orifices 44 is for example distributed over the outside perimeter of wall 45 of diffuser 4, with radial conduits 440 for example, connecting orifices 44 to central internal conduit 43. The first and second sides 41, 42 of diffuser 4 are located within the first and second reserves 3, 5 respectively; said orifice 44 is provided on an outside surface 45 of diffuser 4 extending from first side 41 to second side 42. Diffuser 4 is for example annular around conduit 43, with for example a cylindrical and circular outside peripheral surface 45.

A pressure wave guide 14 is provided between dome 251 and first lid 8 to guide the pressure wave released by part 252 upon ignition of initiator 2 up to first lid 8 so as to open this first lid 8, then retain enough energy to open the second lid 9. Guide 14 is made up of a wall 14 separate from first wall 7 and located within first reserve 3. Wall 14 includes a first part 141 at least partly surrounding the lateral wall 253 of dome 251. Wall 14 is for example attached to lateral wall 25, being for example shrunk onto it. The reduced thickness portion 252 is located in the interior space 142 delimited by this first part 141 within first reserve 3. The first part 141 is connected to a second part 143 of wall 14 leading to first lid 8. Second part 143 of guide wall 14 has for example a smaller cross-section area than that of first part 141, being connected to it by a third tapered part 144 so as to focus the pressure wave from first part 141 to second part 143. Conduit 43 is aligned with the direction of propagation of the pressure wave in guide 14. Walls 7, 9, 14 extend along the longitudinal direction L and are for example tubular. Wall 14 and inside conduit 43 are for example both parallel to the longitudinal direction L.

Second part 143 delimits a second pressure wave guide compartment 145 located in the longitudinal extension of inside conduit 43 of diffuser 4. Inside conduit 43 of diffuser 4 has a geometry allowing the pressure wave to be guided from first side 41 to second side 42 and is therefore a waveguide.

Section 143 of guide 14 has an inside transverse width that is smaller than the inside transverse width of inside conduit 43 of diffuser 4.

One or more through holes 146 are provided in guide wall 14 to allow passage to the gases contained in first reserve 3. Consequently, inside compartments 142 and 145 of wall 14 are also used for storing gas from reserve 3, these gases therefore being located inside and outside of guide wall 14. The inside cross-section area of guide wall 14 is greater than the cross-section area of passage hole(s) 146.

The operation of the gas generator is as follows.

Using an external electrical control circuit, an electrical triggering signal is applied to pins 21, 22 of initiator 2, which ignites a pyrotechnic charge contained in cap 20. Cap 20 then opens, as a result of the combustion of its pyrotechnic charge, on its side 26 in the longitudinal direction S facing the reduced thickness section 252 of dome 251. The pressure generated by the ignition of initiator 2 within compartment 255 delimited by done 251 causes the rupture of reduced thickness section 252 and the release of a pressure wave in the longitudinal direction S. This pressure wave is then guided by wall 14 to the first lid 8. The pressure wave then breaks first lid 8, and then propagates in longitudinal direction S within inside conduit 43 of diffuser 4 to arrive at the second lid 13. The pressure wave then breaks second lid 13.

The gases contained in the two reserves 3 and 5 can then mix by passing through internal conduit 43 of diffuser 4. The ignition of initiator 2 also causes hot particles to be projected through the broken reduced thickness section 252 into internal compartments 141 and 145 of guide 14 and through the broken first lid 8 into internal conduit 43 of diffuser 4. These hot particles then cause the combustion of the first reactive gas with the second reactive gas in internal conduit 43, thus generating third combustion gases which then escape through orifices 44 into the interior of generator 1. Reserves 3 and 5 are then totally drained through orifices 44 even if, as a result of the kinematics of the opening of the gas reserves, there will be gases coming from reserve 7 in particular which will be diffused by orifices 44 without having reacted within the diffuser.

Guide wall 14, separate from outside wall 7 delimiting first reserve 3, prevents the propagation of the pressure wave within the whole first reserve 3 and against first wall 7, which allows the thickness of this first wall 7 to be reduced because it needs less ability to resist the pressure wave. Thus, full pressurization of first reserve 3 is avoided as much as possible. In fact, a correct match is required between the thickness of first wall 7, and therefore its mass, and the maximum internal pressure attained in reserve 3. The propagation of the pressure wave and its reflection against first wall 7 is thus avoided.

Furthermore, the energy losses connected with the geometric propagation of the incident wave emitted by ignition device 2 will be noticeably reduced by the addition of guide 14. As a result, the pyrotechnic charge of ignition device 2 can be considerably reduced. In addition, hot particles emitted by initiator 2 are prevented from remaining in first reserve 3. All the hot particles from initiator 2 are directed outside first reserve 3.

For an initiator having a pyrotechnic charge of 535 milligrams and gas reserves 3 and 5 with an outside diameter of 25 mm, overall pressurization reaches 140 MPa at ambient temperature (about 20° C.), or about 170 MPa at high temperature at ignition time. The addition of guide wall 14 allows a reduction on the order of 50% in the mass of first reserve 3 (including pressure wave guide 14). In addition, the pressure gain at the two lids 8 and 13 is in a ratio of two, which allows an equal reduction in the pyrotechnic mass of initiator 2 and hence the pressure in guide 14, hence a complementary gain in mass.

As compared with the state of the art, a more compact and lighter generator is obtained, at lower cost, having a small number of components. The process for obtaining the components is simple (tube, stamping).

The process for manufacturing the generator is well established (laser or impact welding). The opening time for the gas reserves is reduced.

It is thus possible to open both lids 8 and 13 of reserves 3 and 5 by a single pressure wave, without over-pressurizing gas reserves 3 and 5.

For example, the densest gas is located in first reserve 3 (oxygen) while the less dense gas (hydrogen or helium) is located in second reserve 5 so that the pressure wave can have more energy within guide 14. It is thus possible to open with a single initiator and a single guide two lids closing two reserves with the initiator located in communication with only one of the two reserves (reserve 3 in the foregoing). Internal conduit 43 of diffuser 4 is provided to open the second lid 13 and overcome the back-pressure of second reserve 5.

Second reserve 5 contains a gas flow reduction device 51, made up for example of a transverse wall 510 perforated with through-holes 511, transverse wall 510 being held to the inside surface of wall 9 by a longitudinal wall 512 connected to wall 510 and located for example against second side 42 around second lid 13.

Pressure-wave guide 14 includes a shoulder 147 around its downstream end opening against first lid 8 on first side 41. This shoulder 147, being located against first side 41 in the longitudinal direction S, prevents guide wall 14 from moving when initiator 2 is ignited.

Figure 1A:
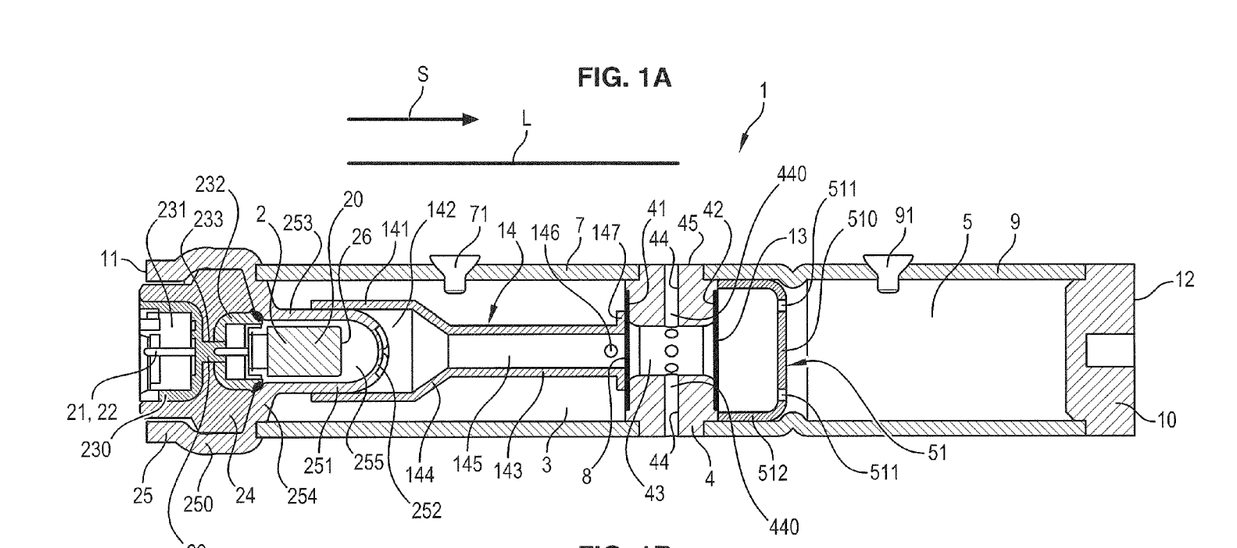
FIG. 1A is a schematic view in longitudinal section of a gas generator according to the invention in a first embodiment.
Figure 1B:
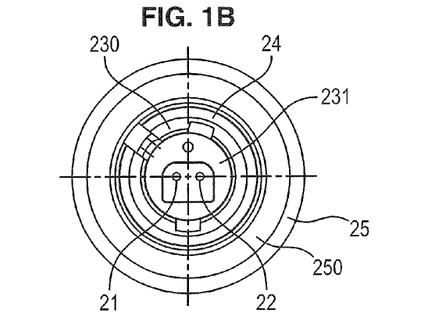
FIG. 1B is a schematic front view of a first longitudinal end of the generator according to FIG. 1A, FIGS. 2, 3 and 4 are schematic views in longitudinal section of second, third and fourth embodiments of the generator according to the invention.
Figure 3:
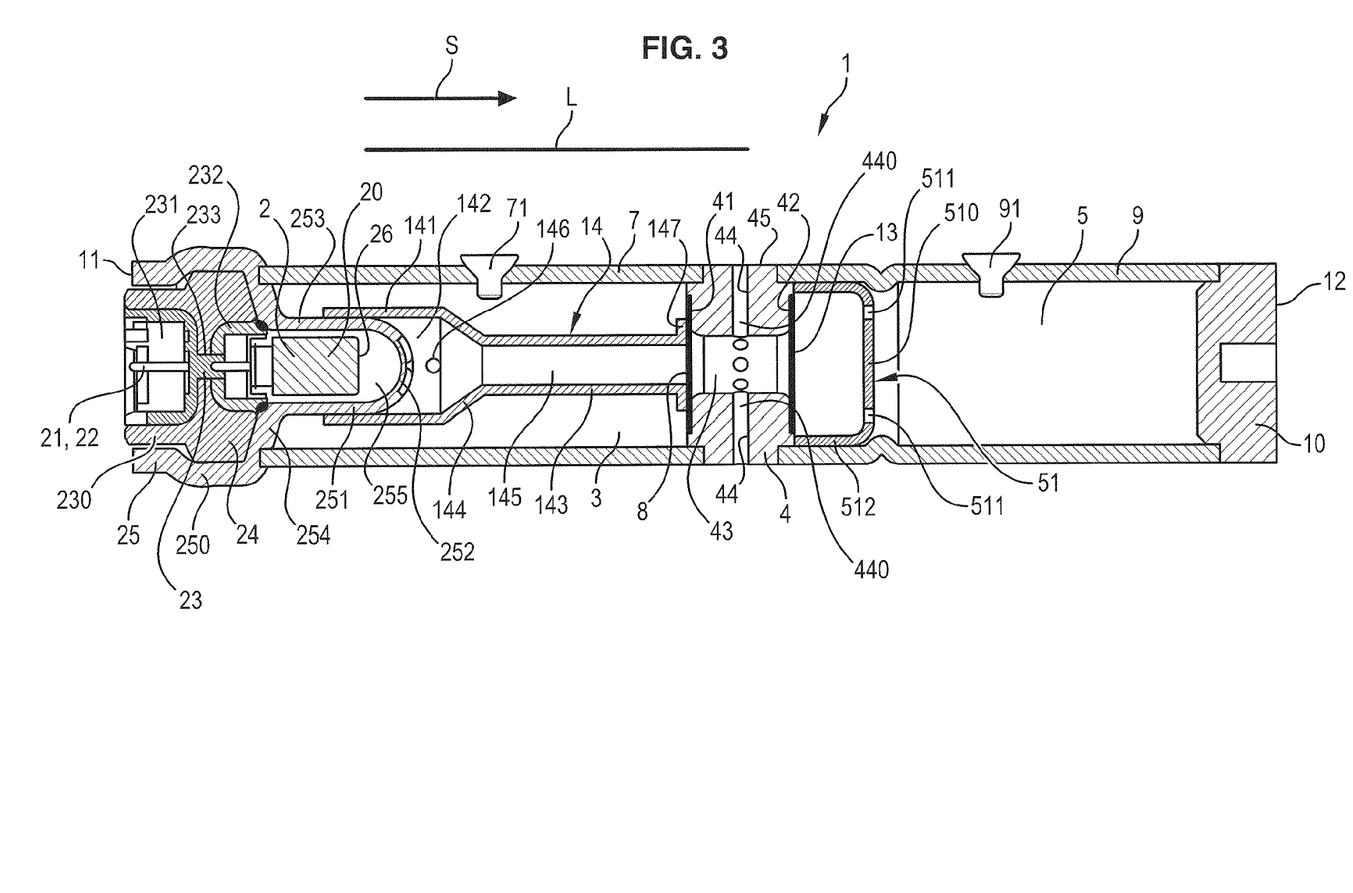

In the embodiment shown in FIGS. 1A, 1B and 3, shoulder 147 bears on the part of first lid 8 that is attached to first side 41 of diffuser 4, and has a transverse width that is less than the inside transverse width of wall 7 to leave space between it and this wall 7.

Figure 4:
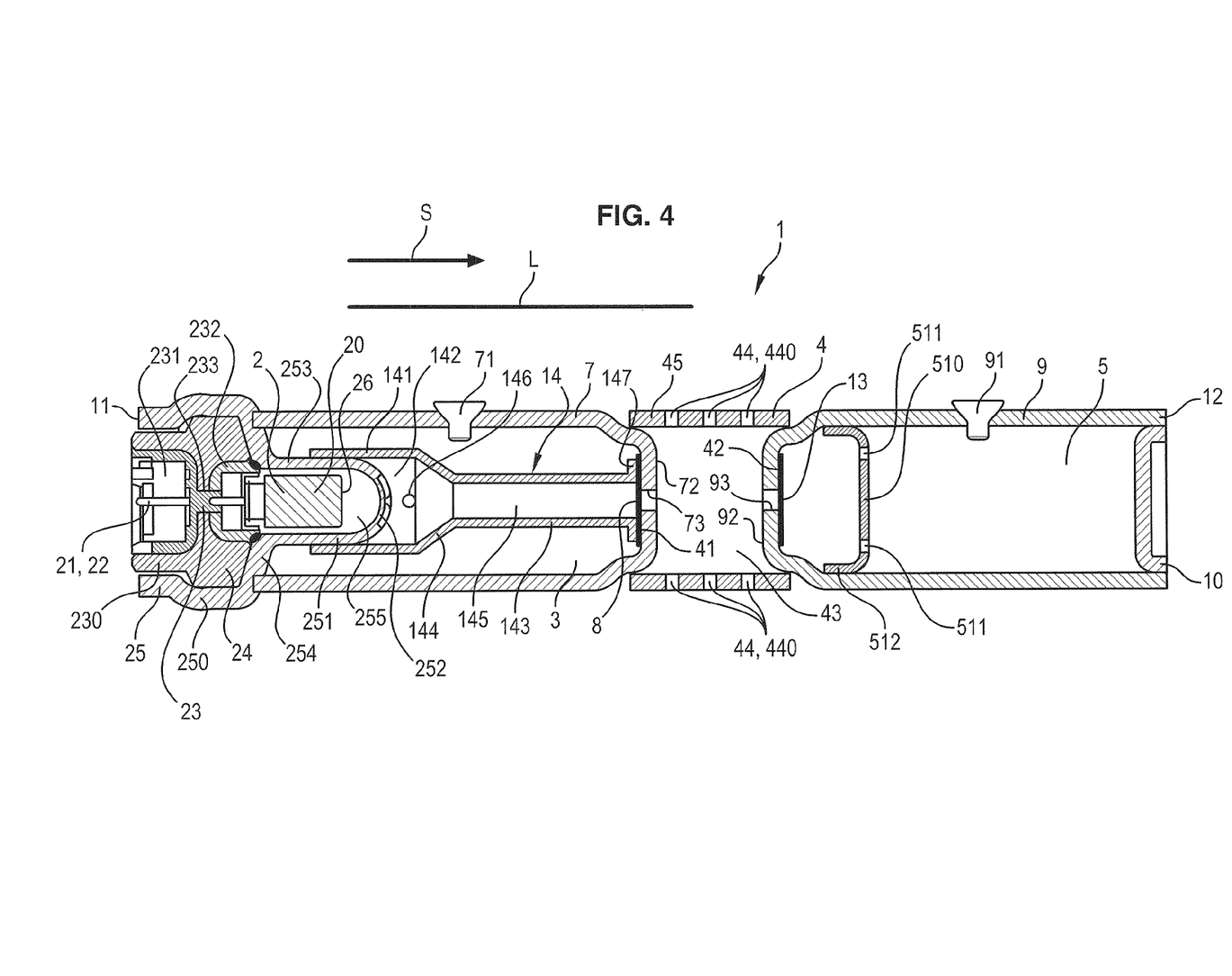

In the embodiment shown in FIGS. 3 and 4, gas passage hole(s) 146 through wall 14 (is) are provided in its first part 141 surrounding the reduced thickness section 252, facing it in longitudinal direction S.

In the embodiment shown in FIG. 1A, gas passage hole(s) 146 through wall 14 (is) are located in second part 143, near first lid 8 for example.

Figure 2:
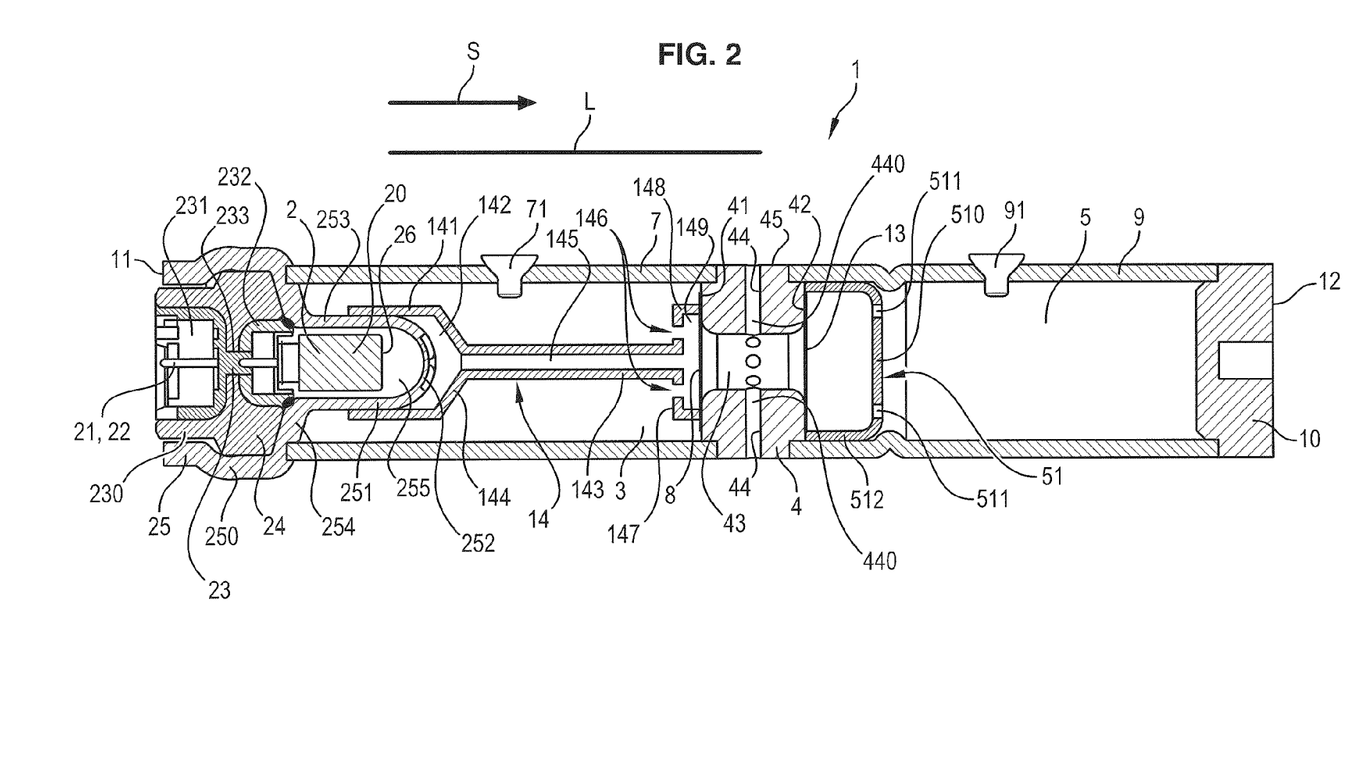

In the embodiment shown in FIG. 2, shoulder 147 is extended by a section 148 delimiting an internal compartment 149 with the lid 8. Consequently, part 143 of guide wall 14 opens into internal compartment 149 which is therefore in communication with internal compartment 145. Section 148 bears on the part of lid 8 that is attached to first side 41 of diffuser 4 and is spaced away from the inner surface of wall 7. The transverse width of part 143 is for example less than the transverse width of internal conduit 43 of diffuser 4, while facing it in the longitudinal direction L. Gas passage hole(s) 146 are for example provided in shoulder 147 spaced away from lid 8 and first side 41.

In the embodiment of FIG. 2, part 143 has an inside transverse width that is smaller than in the other FIGS. 1A, 1B, 3 and 4, which allows even more focusing of the pressure wave toward lids 8 and 13.

In the embodiment shown in FIG. 4, lids 8, 13 are attached, not to diffuser 4 but to reserves 3 and 5. Reserve 3 has its outside wall 7 extended toward diffuser 4 by an internal transverse wall 72 in which there is a gas passage hole 73. First lid 8 is attached to the internal wall 72 so as to close hole 73 and reserve 3. Inside wall 72 therefore forms the first distinct side 41 of diffuser 4. Lid 8 is attached to wall 72 for example by being on side 41 of reserve 3, spaced away from diffuser 4. Reserve 5 has its outside wall 9 extended toward diffuser 4 by an internal transverse wall 92 in which there is a gas passage hole 93. The second lid 13 is attached to wall 92 so as to close hole 93 and reserve 5. Inside wall 92 therefore forms the second distinct side 42 of diffuser 4. Lid 13 is attached to wall 92 for example by being on side 42 of reserve 5, spaced away from diffuser 4. Diffuser 4 has its outside wall 45 delimiting internal conduit 43 between walls 72 and 92 by surrounding them and being attached to walls 7 and 9. Hole 73 opens into internal compartment 145 of guide wall 14, so that the pressure wave sent into wall 14 breaks lid 8, passes through hole 73, then conduit 43 and hole 93, then breaks lid 13. The thickness of wall 45 of diffuser 4 can be reduced to its absolute minimum. For example, reserves 3, 5 are stamped to form walls 72, 92. For example, orifices 44 may be also distributed lengthwise along wall 45 of diffuser 4. Diffuser 4 is for example formed from a simple tube perforated with orifices 44 on its wall 45. Holes 73, 93 are aligned along the direction of propagation of the pressure wave in guide 14.

Of course, lids 8, 13 can be independently attached to the outside or the inside of reserves 3 and 5.

Figure 5:
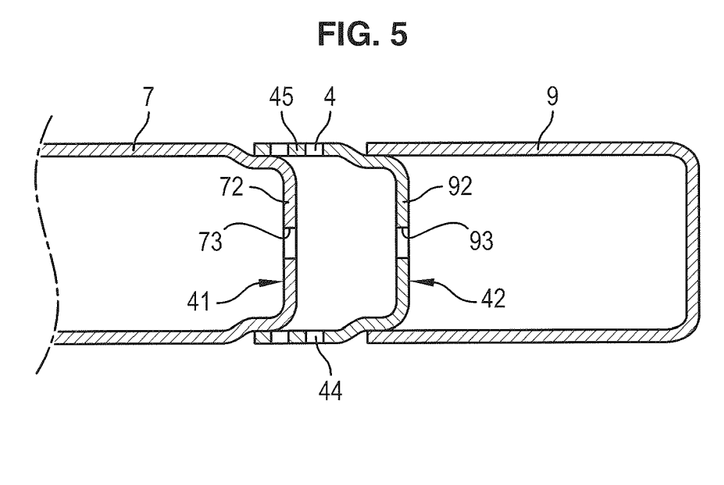
FIG. 5 shows a variant of FIG. 4.

FIG. 5 shows a variant of FIG. 4. In FIG. 5, only walls 7, 9 and diffuser 4 are shown, the other elements of the generator, not shown, being identical to those in FIG. 4. In FIG. 5, diffuser 4 is made up of a stamped tube including outside wall 45 extended by a stamped portion constituting wall 92 making up second side 42 having hole 93. Wall 9 is attached to wall 45 by surrounding wall 92.

The invention claimed is:

1. A gas generator with reactive gases, the gas generator comprising:
    a first reserve of pressurized gas delimited by a first wall containing a first reactive gas;
    a second reserve of pressurized gas containing a second reactive gas for reacting with the first reactive gas to create a combustion gas;
    an ignition device in a first longitudinal end of the generator;
    at least one outlet orifice for the combustion gas;
    a diffusing device for diffusing combustion gas towards an outside, the diffusing device along with the ignition device, the first gas reserve, and the second gas reserve being successively positioned along a longitudinal direction;
    a first closing lid closing the first reserve and capable of being opened, the first closing lid provided between the first gas reserve and the diffusing device;
    a second closing lid closing the second reserve capable of being opened, the second closing lid provided between the diffusing device and the second gas reserve; and
    a guiding wall, distinct from the first wall, provided in the first gas reserve for guiding a pressure wave generated by the ignition device up to the first dosing lid in order to open the first closing lid, the guiding wall including at least one hole for letting through gas in the first reserve;
    the diffusing device including a conduit for letting through gas, the conduit arranged to guide the pressure wave from the first dosing lid to the second closing lid in order to open the second closing lid, and which communicates with the outlet orifice;
    wherein the ignition device is capable of being actuated in order to open the first and second closing lids and initiate combustion of the first reactive gas with the second reactive gas in order to generate combustion gas.

2. The gas generator according to claim 1, wherein the first wall extends towards the diffusing device with a first inner wall having at least one hole for letting through gas, closed by the first lid attached to the first inner wall, the second reserve is delimited by an outer wall extending towards the diffusing device with a second transverse inner wall having at least one hole for letting through gas closed by the second lid attached to the second inner wall.

3. The gas generator according to claim 2, wherein the first closing lid is attached to the first inner wall on a side of the reserve away from the diffusing device.

4. The gas generator according to claim 2, wherein the second closing lid is attached to the second inner wall on a side of the second reserve away from the diffusing device.

5. The gas generator according to claim 2, wherein the diffusing device has an outer diffusing wall, which delimits an inner conduit, which includes the at least one outlet orifice and which surrounds the first and second inner walls of the first and second reserves, formed by stamping of the first and second outer walls.

6. The gas generator according to claim 1, wherein the guiding wall includes a shoulder bearing against the first dosing lid attached to the diffusing device.

7. The gas generator according to claim 1, wherein the ignition device includes an electro-pyrotechnic initiator including electric control pins which are accessible at the first longitudinal end of the generator and a cap containing a pyrotechnic charge including one side turned towards a separation wall for separation relatively to the first reserve, so that application of an electric control signal to the pins causes ignition of the pyrotechnic charge of the initiator causing breaking of the separation wall and release of the pressure wave in the guiding wall upon triggering.

8. The gas generator according to claim 1, wherein the first and second lids are attached onto first and second sides of the diffusing device respectively, the conduit opening into the first side towards the first lid on the one hand and into the second side towards the second lid on the other hand, the conduit in the extension of the guiding wall.

9. The gas generator according to claim 8, wherein the first and second sides of the diffusing device are located inside the first and second reserves respectively, the orifice provided on an outer surface of the diffusing device extending between the first side and the second side.

10. A gas generator comprising:
    a first reserve of pressurized gas delimited by a first wall, the first reserve of pressurized gas containing a first reactive gas;
    a second reserve of pressurized gas containing a second reactive gas;
    an ignition device provided in a first longitudinal end of the generator;
    a diffusing device for diffusing combustion gas towards an outside, the diffusing device along with the ignition device, the first gas reserve, and the second gas reserve being successively positioned along a longitudinal direction;
    a first closing lid closing the first reserve and capable of being opened, the first closing lid provided between the first gas reserve and the diffusing device;
    a second closing lid closing the second reserve capable of being opened, the second closing lid provided between the diffusing device and the second gas reserve; and
    a guiding wall in the first reserve of pressurized gas and spaced from the first wall, the guiding wall for guiding a pressure wave generated by the ignition device up to the first closing lid in order to open the first closing lid, the guiding wall including at least one hole in communication with the first gas reserve;

wherein the ignition device is capable of being actuated in order to open the first and second closing lids and initiate combustion of the first reactive gas with the second reactive gas in order to generate combustion gas.

11. The gas generator of claim 10, wherein the diffusing device defines a chamber partially delimited by a first internal transverse wall having a first passage covered by the first closing lid and a second internal transverse wall having a second passage covered by the second closing lid.

12. The gas generator of claim 10, wherein the at least one hole allows for flux of gas between an internal compartment defined by the guiding wall and the first reserve of pressurized gas.

13. A gas generator comprising:
a first reserve of pressurized gas;
a second reserve of pressurized gas;
a diffusing device for diffusing combustion gas toward an outside;
a guide tube disposed in the first reserve of pressurized gas, the guide tube including at least one hole in communication with the first gas reserve;
a first closing lid closing the first reserve, the first closing lid disposed between the diffusing device and the first gas reserve;
a second closing lid closing the second reserve, the second closing lid disposed between the diffusing device and the second gas reserve;
an ignition device proximate the guide tube and operative to generate a pressure wave for opening the first and second closing lids.

14. The gas generator of claim 13, wherein the diffusing device along with the ignition device, the first gas reserve, and the second gas reserve are successively positioned along a longitudinal direction.

15. The gas generator of claim 13, wherein the diffusing device defines a chamber partially delimited by a first internal transverse wall having a first passage covered by the first closing lid and a second internal transverse wall having a second passage covered by the second closing lid.

16. The gas generator of claim 13, wherein the at least one hole allows for flux of gas between an internal compartment defined by the guide tube and the first reserve of pressurized gas.

* * * * *